(12) United States Patent
Otake

(10) Patent No.: US 6,532,343 B1
(45) Date of Patent: Mar. 11, 2003

(54) CAMERA FINDER DEVICE

(75) Inventor: Katsuhiro Otake, Ohmiya (JP)

(73) Assignee: Fuji Photo Optical Co., Ltd., Saitama-ken (JP)

( * ) Notice: Subject to any disclaimer, the term of this patent is extended or adjusted under 35 U.S.C. 154(b) by 0 days.

(21) Appl. No.: 09/586,347

(22) Filed: Jun. 2, 2000

(30) Foreign Application Priority Data

Jun. 4, 1999 (JP) .......................................... 11-157224

(51) Int. Cl.$^7$ .......................... G03B 13/16; G03B 19/14
(52) U.S. Cl. ...................... 396/148; 396/373; 396/384; 396/353
(58) Field of Search ................................ 396/148, 373, 396/378, 384, 385, 374, 353

(56) References Cited

U.S. PATENT DOCUMENTS

| | | | |
|---|---|---|---|
| 4,443,086 A | * 4/1984 | Hosoe et al. | 396/147 |
| 4,757,336 A | * 7/1988 | Nakayama et al. | 396/378 |
| 5,692,227 A | 11/1997 | Yokota et al. | 396/377 |
| 5,694,628 A | * 12/1997 | Nishitani | 396/379 |

FOREIGN PATENT DOCUMENTS

| JP | 07005527 A | 1/1995 |
|---|---|---|
| JP | 08136983 A | 5/1996 |
| JP | 08160501 A | 6/1996 |

* cited by examiner

*Primary Examiner*—David M. Gray
*Assistant Examiner*—Rochelle Blackman
(74) *Attorney, Agent, or Firm*—Price, Heneveld, Cooper, DeWitt & Litton (57) ABSTRACT

A finder device is disclosed in which a finder optical system is provided with an auto-focus function separate from that of a photographic optical system so that the subject image can be observed sharply even when the finder optical system undergoes a change of state due to temperature and other causes. A semitransparent mirror is interposed between an objective lens system and an erecting optical system to branch out a focus detection system optical path from a finder system optical system. A focus detection device is arranged on the focus detection system optical path so that its focus detection plane is situated at the equivalent position to the focal plane of the finder. The state of focus is obtained from the subject image formed on the focus detection plane by using a phase difference detection system or the like. Driving means moves a focus lens system forward/backward along the optical axis so that the subject image focuses on the focus detection plane. The subject image also focuses on the focal plane situated at the equivalent position to the focus detection plane. This allows sharp observation of the subject image through an eyepiece lens system.

9 Claims, 5 Drawing Sheets

CAMERA FINDER DEVICE

BACKGROUND OF THE INVENTION

The present invention relates to a finder device of a camera, and more particularly to a finder device having an auto-focus function.

DESCRIPTION OF THE RELATED ART

For handy photography, cameras with a variable focusing device such as a zoom lens device have become common. In popular model cameras of this type, the photographic optical system is ever increasing in magnification power for the sake of more photographing fun. The finder optical system also implements a real image type zoom finder or the like so as to change in focal length along with the photographic optical system. That is, the finder optical system is configured to follow the movement of the photographic optical system. In close-ups, part of the lenses in the objective lens system of the finder optical system is/are moved to a predetermined position on the basis of the subject range information obtained through the auto-focus function for the photographic optical system. The focusing position of the objective lens system is thus adjusted to the focus position for close-ups.

Meanwhile, since increased powers of the finder optical system complicate the adjustment of diopter, there have been proposed finders capable of easy diopter adjustments. For example, Japanese Patent Laid-Open Publication No. 07005527 A discloses a finder of a camera comprising a photographic optical system and a finder optical system arranged independent of each other. In the camera finder, a first lens group in the finder optical system is continuously moved on the basis of the subject distance information output from distance measuring means provided in the camera, so that diopter variations and parallax resulting from changes in the distance to the subject are corrected continuously.

Japanese Patent Laid-Open Publication No. 08136983 A discloses a diopter-adjustable camera having a finder optical system including a display unit arranged in the finder optical system for displaying the relative relation to a subject image within the finder; an image-forming optical system for forming the subject image onto the display unit; a diopter adjustment optical system for introducing the beam of light transmitted and formed through the image-forming optical system and the display unit, and adjusting the same to a predetermined diopter; a ranging unit for measuring the distance to the subject; and a control unit for controlling the image-forming optical system based on the range measurement of the ranging unit. In the diopter-adjustable camera, the diopter adjustment optical system is driven with the subject image formed on the display unit.

Moreover, Japanese Patent Laid-Open Publication No. 08160501 A discloses a camera finder device having a finder auto-focus optical system and a finder zoom optical system on its optical path. In the finder, the magnification power of the finder ZOOM Optical system is detected by a finder control device. The finder control device then controls the finder auto-focus optical system in accordance with the above-mentioned magnification power as well as a ranging output for use in the focus adjustments to the photographic optical system, the output being selected from among a plurality of ranging points including the screen center.

Each of the conventional finder devices disclosed in the above publications, the finder optical system, driven on the basis of subject distance information obtained by the ranging unit provided in the photographic optical system, is inevitably affected by the state of the photographic optical system. That is, in the prevailing model cameras described above, the photographic optical system and the finder optical system are separate optical systems, and, therefore, the optical systems come into different states when temperature variations and the like occur. This means that driving the finder optical system on the basis of the range information concerning the photographic optical system can fail to focus the finder optical system. As a result, the photographer might have difficulty in recognizing the subject through the finder, possibly precluding the desired composition of a photograph.

SUMMARY OF THE INVENTION

In view of the foregoing, it is an object of the present invention to provide a camera finder device which can accurately obtain focus even when its finder optical system undergoes a change of state due to temperature and other causes.

As the technical means to achieve the foregoing object, the finder device of a camera according to the present invention is a finder device of a camera comprising a variable focusing device for changing the focal length of a photographic optical system. Here, the optical path of a finder optical system is branched out to form a focus detection system. Focus detecting means having a focus detection plane situated on the optical path of the focus detection system at an equivalent position to the focal plane of an objective lens system is provided. Driving means for moving an appropriate optical member of the finder optical system forward and backward along the optical axis is provided. The driving means move the appropriate optical member forward and backward on the basis of a detection signal from the focus detecting means, so that the finder optical system focuses on the focal plane.

When this finder is pointed at a subject, the subject image is formed on the focal plane as well as the focus detection plane of the focus detection system. Based on this subject image formed on the focus detection plane, the detection signal is output to the driving means, and an optical member constituting the finder optical system is moved forward/backward along the optical axis to adjust the subject image to be formed on the focus detection plane. Here, the optical member is positioned to focus on the detection plane by using a phase difference detection system or a hill-climbing contrast detection system, for example. The focus detection plane and the focal plane of the finder optical system are in equivalent positions to each other. Therefore, the in-focus state on the focus detection plane means the in-focus state on the focal plane which can be observed through an eyepiece lens to see the subject image in focus. Moreover, the in-focus state on the focal plane can be secured even when the finder optical system undergoes a change of state due to temperature variations and the like. The focus detection can be performed in synchronization with the ranging operation for the photographic optical system when the shutter release button is half pressed.

The finder device of a camera according to another aspect of the invention is the finder device wherein: the finder device is comprised of the objective lens system and an eyepiece lens system; the optical path is branched out in front of the eyepiece lens system to form the focus detection system; and the driving means move an appropriate optical member of the objective lens system forward/backward.

That is, the camera comprising a variable focusing device for changing the focal length includes the finder device having an objective lens system and an eyepiece lens system. In the finder device, the optical path of the finder optical system is branched out in front of the eyepiece lens system to form the focus detection system. The focus detecting means has a focus detection plane situated on the optical path of the focus detection system, at an equivalent position to the focal plane. The driving means for moving an appropriate optical member of the objective lens system is provided. The driving means moves the appropriate optical member on the basis of a detection signal from the focus detecting means so that the finder optical system focuses on the focal plane.

The appropriate optical member of the objective lens system can be moved forward/backward along the optical axis by the driving means on the basis of the detection, signal output from the focus detecting means, to change the focusing position of the subject image. Therefore, the optical member is shifted to a position where the subject image comes into focus on the focus detection plane. Accordingly, on the focal plane situated at the equivalent position to the focus detection plane is also formed the subject image, which can be observed through the eyepiece lens system to see the in-focus subject image. In the finder device of a camera according to a further aspect of the invention, the driving means move a focus lens system in the objective lens system forward/backward. In the finder device of a camera according to another aspect of the invention, the driving means move the entire objective lens system forward/backward.

The optical member to be driven by the driving means on the basis of the detection signal of the focus detecting means may be the focus lens system in the objective lens system or the entire objective lens system. In either case, the subject image can be accurately formed on the focal plane so that the subject image is seen through the eyepiece lens system even when the finder optical system undergoes a change of state due to temperature variations and the like.

The finder device of a camera according to yet another aspect of the invention is a finder device of a camera comprising a variable focusing device for changing the focal length of a photographic lens. Here, a finder optical system having an objective lens system and an eyepiece lens system is provided. The optical path of the finder optical system is branched out in front of the eyepiece lens system to form a focus detection system. Focus detecting means having its focus detection plane situated on the optical path of the focus detection system is provided. Driving means for moving an appropriate optical member of the eyepiece lens system forward and backward along the optical axis is provided. The driving means move the appropriate optical member forward/backward on the basis of a detection signal from the focus detecting means so that the focus position of the eyepiece lens system is adjusted to the focus position formed by the objective lens system.

That is, the eyepiece lens system is driven by the driving means on the basis of the detection signal of the focus detecting means, so that the focus position of the eyepiece lens system is adjusted to the focus position formed by the objective lens system. In this manner, diopter correction is performed.

In the finder device of a camera according to another aspect of the invention, the driving means move a dioptric lens system in the eyepiece lens system forward/backward. In the finder device of a camera according to a further aspect of the invention, the driving means move the entire eyepiece lens system forward/backward.

Moving the dioptric lens system forward/backward provides the coincidence between the focus position of the eyepiece lens system and the focus position formed by the objective lens system, thereby performing diopter correction. Moving the entire eyepiece lens system also adjusts the focus position of the eyepiece lens system to that of the objective lens system to perform diopter correction.

In the finder device of a camera according to yet another aspect of the invention, the driving means moves a focus lens system in the eyepiece lens system forward/backward. In the finder device of a camera according to another aspect of the invention, the eyepiece lens system is provided with a dioptric lens system aside from the focus lens system.

The nature, principle, and utility of the invention will become more apparent from the following detailed description when read in conjunction with the accompanying drawings.

DETAILED DESCRIPTION OF THE EMBODIMENTS

Hereinafter, the camera finder device according to the present invention will be described concretely with reference to the preferred embodiments shown in the drawings.

Figure 1:
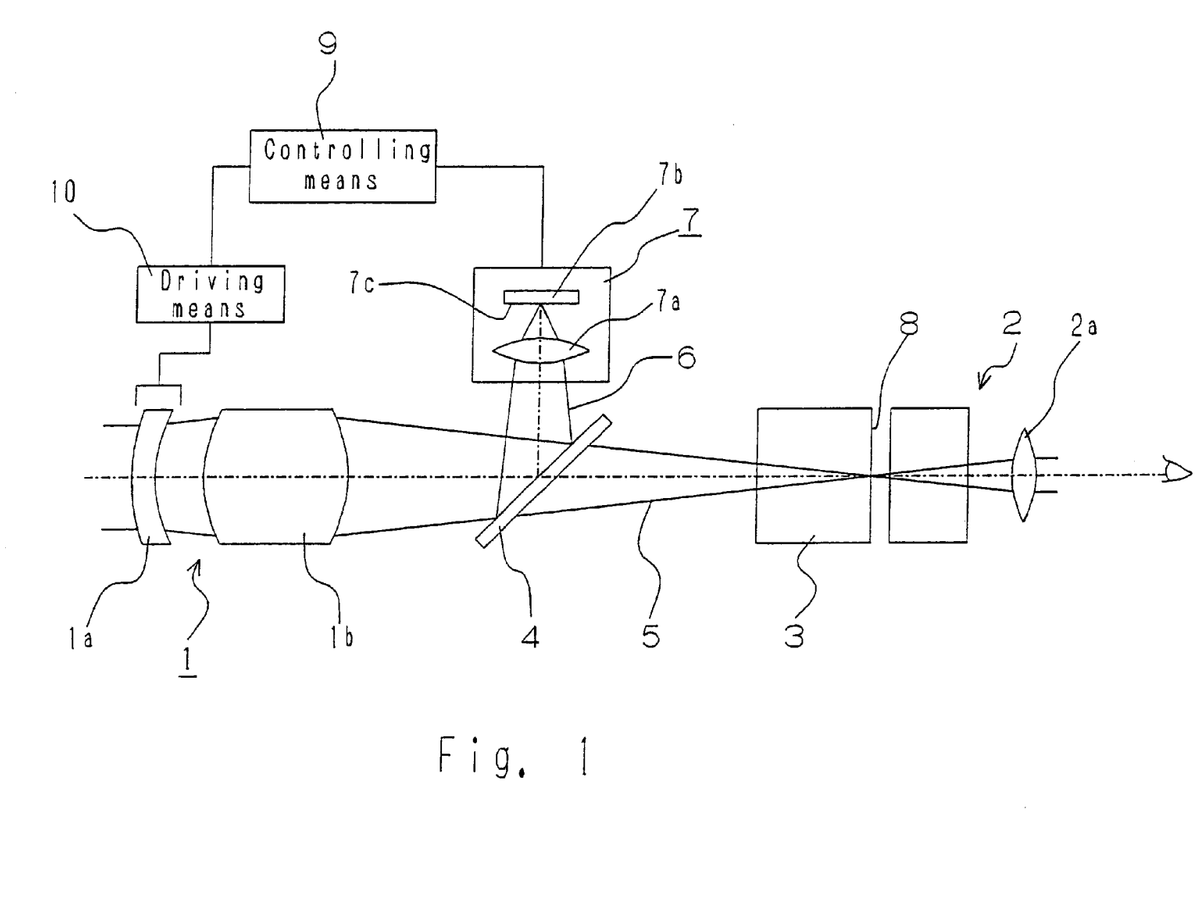
FIG. 1 is a block diagram of a finder optical system showing a first embodiment of the camera finder device according to the present invention.

FIG. 1 is a diagram showing the first embodiment of the camera finder device according to the present invention. This finder device is a real image type finder comprising an objective lens system 1 consisting of a focus lens system 1a and a zoom lens system 1b; an eyepiece lens system 2, and an erecting optical system 3 consisting of a Porro prism or the like. A semitransparent mirror 4 is interposed between the objective lens system 1 and the erecting optical system 3 so that the optical path extending from the objective lens system 1 to the eyepiece lens system 2 is branched out by the semitransparent mirror 4 to form a finder system optical path 5 and a focus detection system optical path 6. The finder system optical path 5 includes the eyepiece lens system 2. The photographer observes a subject through an eyepiece lens 2a in this eyepiece lens system 2.

On the focus detection system optical path 6 is arranged a focus detection device 7 serving as the focus detecting means. The focus detection device 7 comprises an imaging lens 7a and a focusing sensor 7b having its focus detection plane 7c situated at the image-forming position of the imaging lens 7a. This focus detection plane 7c of the focusing sensor 7b and the focal plane 8 situated in the eyepiece lens system 2 are put in equivalent positions to each other.

The output signal of the focus detection device 7 is sent to controlling means 9 which consist mainly of a CPU. The controlling means 9 provides a drive signal to driving means 10. On the basis of this drive signal, the driving means 10 move the focus lens system 1a forward/backward along the optical axis to change the focusing position of the subject image.

In the focus detection device 7, the focusing state of the subject image on the focus detection plane 7c of the focusing sensor 7b is detected on the basis of the subject image incident on the focusing sensor 7b, by using e.g. a so-called phase difference detection system or hillclimbing contrast detection system. A detection signal concerning the state is output to the controlling means 9. On the basis of this detection signal, the controlling means 9 determines whether the subject image formed on the focus detection plane 7c is situated toward the front or the back, and issues a command to the driving means 10 as to the moving direction of the focus lens system 1a.

Now, the operation of the first embodiment of the camera finder device according to the present invention having the above configuration will be described.

When a subject is observed through this finder device, the subject image is formed on the focusing sensor 7b of the focus detection device 7 through the focus detection system optical path 6. The detection signal concerning this subject image is sent from the focus detection device 7 to the controlling means 9. The controlling means 9 processes the signal and issues a drive signal to the driving means 10. The driving means 10 moves the focus lens system 1a forward or backward on the basis of the drive signal. The forward/backward movement of the focus lens system 1a brings the subject image formed on the focus detection plane 7c of the focusing sensor 7b into focus on the focus detection plane 7c.

The focus detection plane 7c of the focusing sensor 7b is situated at the equivalent position to the focal plane 8 of this finder device. Therefore, the subject image is formed on the focal plane 7c and on the focal plane 8 as well. This subject image formed on the focal plane 8 is observed through the eyepiece lens 2a, so that the subject image can be observed sharply. Thus, the subject image is focused on the focal plane 8 by using the focus detection device 7. Accordingly, even if the finder optical system undergoes a change of state due to temperature variations and the like, the subject image can be accurately focused on the focal plane 8 so that the photographer observes the subject image sharply. In addition, the finder optical system brings the subject image into focus on the focal plane 8 by itself, independent of the distance information obtained by the auto-focus device in the photographic optical system. Therefore, the subject image can always be observed sharply without being affected by a change of state of the photographic optical system.

Figure 2:
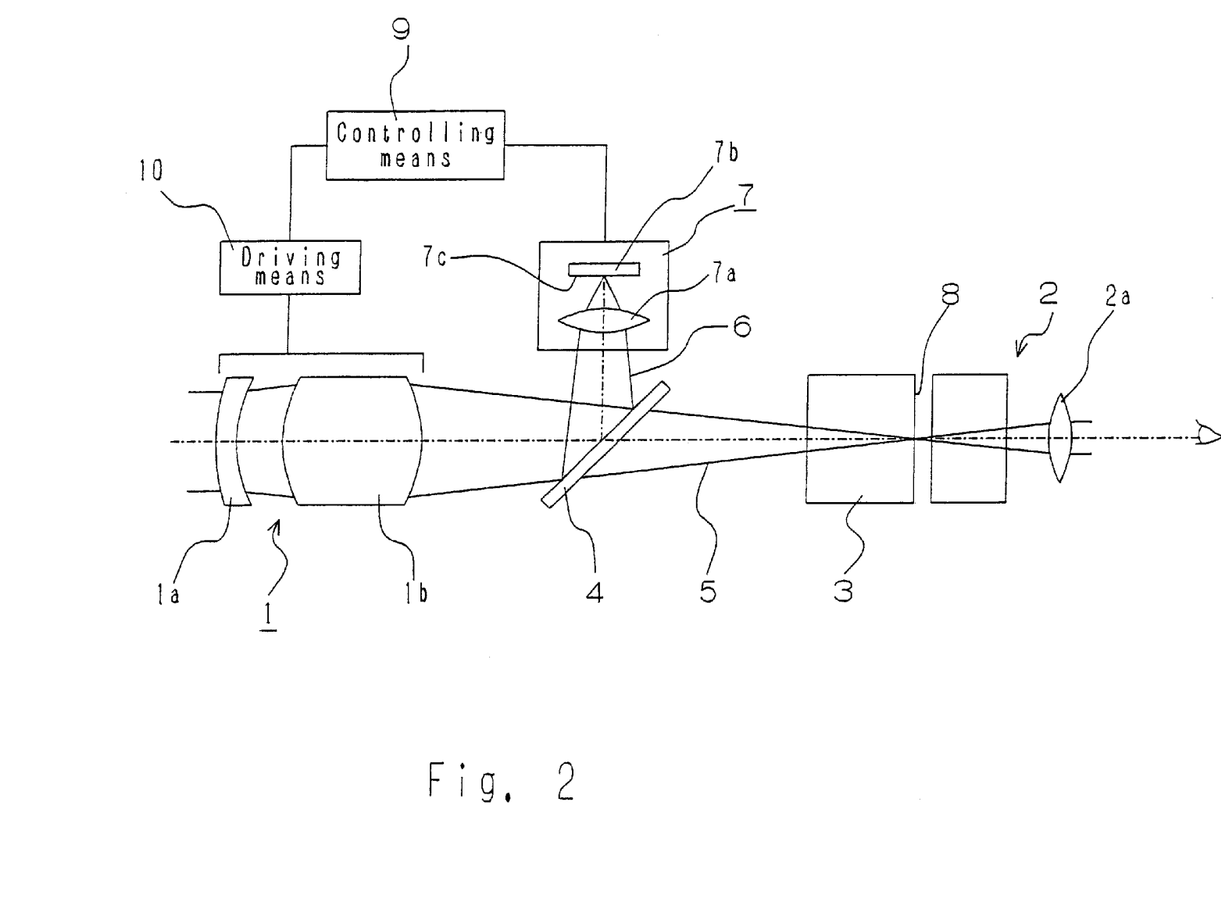
FIG. 2 is a block diagram of a finder optical system showing a second embodiment of the invention.

FIG. 2 shows the second embodiment of the camera finder device according to the present invention. In the diagram, the same parts as those of the camera finder device according to the first embodiment are designated by identical reference numerals. This camera finder device according to the second embodiment is to move the entire objective lens system 1 forward/backward along the optical axis using the driving means 10 according to the first embodiment.

That is, the camera finder device according to the second embodiment moves the entire objective lens system 1 forward/backward to form a subject image on the focus detection plane 7c of the focusing sensor 7b in the focus detection device 7, whereby a subject image is formed on the focal plane 8, which is in an equivalent position to detection plane 7c, and this subject image is observed through the eyepiece lens 2a. Accordingly, even if the objective lens system 1 undergoes a change of state due to temperature variations and the like, the subject image is accurately focused on the focal plane 8. This allows sharp observation of the subject image.

Figure 3:
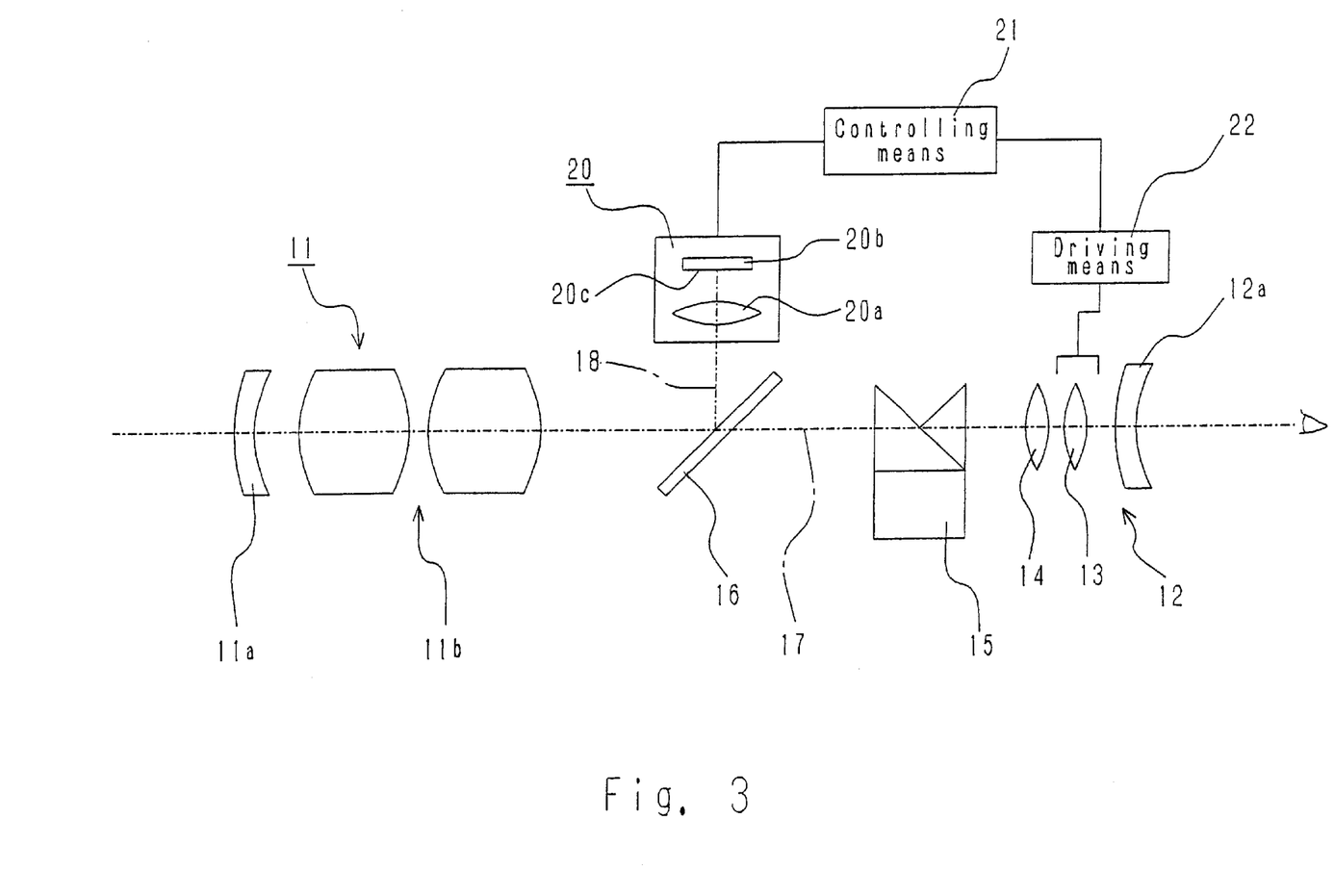
FIG. 3 is a block diagram of a finder optical system showing a third embodiment of the invention.

FIG. 3 shows the third embodiment of the camera finder device according to the present invention. This camera finder device is constituted as a real image type finder comprising an objective lens system 11, an eyepiece lens system 12, and an erecting optical system 15. The objective lens system 11 consists of a focus lens system 11a and a zoom lens system 11b. The eyepiece lens system 12 consists of an eyepiece lens 12a, a dioptric lens system 13, and a focus lens system 14. The erecting optical system 15 consists of a Porro prism or the like. A semitransparent mirror 16 is interposed between the objective lens system 11 and the erecting optical system 15 so that the optical path extending from the objective lens system 11 to the eyepiece lens system 12 is branched out to form a finder system optical path 17 and a focus detection system optical path 18. The photographer observes the subject image formed on the finder system optical path 17, through the eyepiece lens 12.

On the focus detection system optical path 18 is arranged a focus detection device 20 serving as the focus detecting means. The focus detection device 20 comprises an imaging lens 20a and a focusing sensor 20b having its focus detection plane 20c situated at the image-forming position of the imaging lens 20a.

The output signal of the focus detection device 20 is sent to controlling means 21 which consist mainly of a CPU. The controlling means 21 provides a drive signal to driving means 22. On the basis of this drive signal, the driving means 22 moves the dioptric lens system 13 forward/backward along the optical axis to change the focusing position of the subject image.

In the focus detection device 20, the focusing state of the subject image incident on the focusing sensor 20b is detected, and a detection signal concerning the state is output to the controlling means 21. On the basis of this detection signal, the controlling means 21 determines whether the subject-image formed on the focus detection plane 20c is situated toward the front or the back and issues a command, to the driving means 22 as to the moving direction of the dioptric lens system 13.

Hereinafter, description will be given of the operation of the camera finder device according to the third embodiment having the configuration described above.

When a subject is observed through this finder device, the subject image is formed on the focus detection plane 20c of the focusing sensor 20b in the focus detection device 20 through the focus detection system optical path 18. The detection signal concerning this subject image is sent from the focus detection device 20 to the controlling means 21. The controlling means 21 processes the signal and provides a drive signal to the driving means 22. On the basis of this drive signal, the driving means 22 moves the dioptric lens system 13 forward/backward along the optical axis so that the focus position of the finder is adjusted to the image-forming position of the subject within the finder system optical path 17. That is, the equivalent position on the finder system optical path 17 is calculated from the data concerning the subject image formed on the focusing sensor 20b, and the eyepiece lens system 12 is focused on the equivalent position. This creates a diopter-adjusted state, in which the photographer can observe the subject image sharply through the eyepiece lens 12a. Moreover, the finder is focused on the forming position of the subject image. Accordingly, even if the finder optical system undergoes a change of state due to temperature variations and the like, it is possible to accurately focus on the subject image so that the photographer can observe the subject image sharply. Besides, the finder optical system focuses on the subject image by itself, independent of the distance information obtained by the auto-focus device in the photographic optical system. Therefore, the subject image can always be observed sharply even when the photographic optical system undergoes a change of state due to temperature and other causes.

Figure 4:
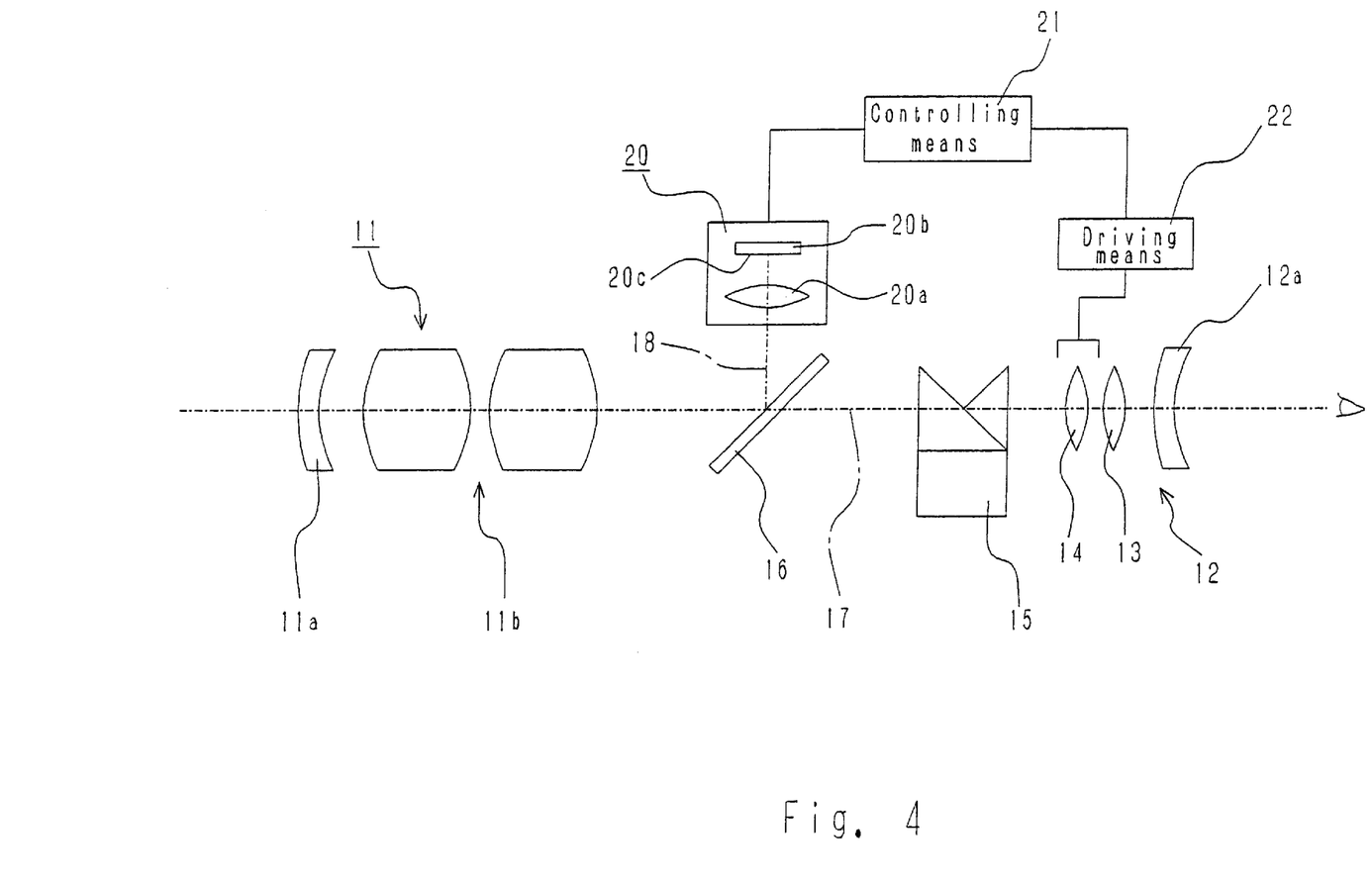
FIG. 4 is a block diagram of a finder optical system showing a fourth embodiment of the invention.

FIG. 4 is a diagram showing a fourth embodiment of the camera finder device according to the present invention. In the diagram, the same parts as those of the camera finder device to according to the third embodiment are designated by identical reference numerals, This camera finder device according to the fourth embodiment moves the focus lens system 14 in the eyepiece lens system 12 forward/backward along the optical axis using the driving means 22 according to the third embodiment.

That is, the camera finder device according to the fourth embodiment moves the focus lens system 14 forward/backward so that the focus position of the eyepiece lens system 12 is adjusted to the image-forming position of the subject image for observation through the eyepiece lens 12a. Therefore, the subject image can be observed sharply even when the objective lens system 11 undergoes a change due to temperature variations and the like.

Figure 5:
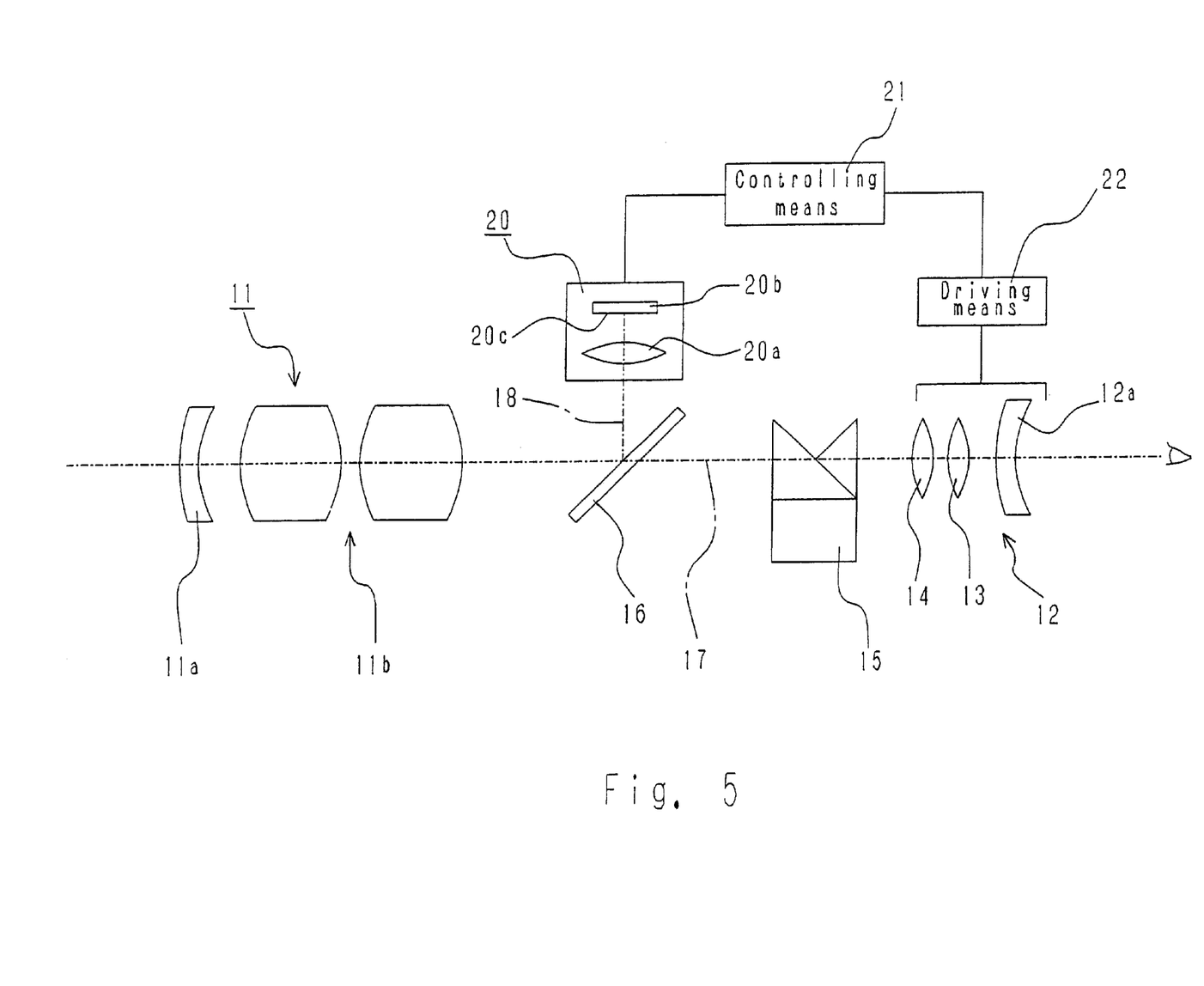
FIG. 5 is a block diagram of a finder optical system showing a fifth embodiment of the invention.

FIG. 5 shows the fifth embodiment of the camera finder device according to the present invention. In the diagram, the same parts as those of the camera finder device according to the third embodiment are designated by identical reference numerals. This camera finder device according to the fifth embodiment is to move the entire lens system 12 forward/backward along the optical axis using the driving means 22 according to the third embodiment.

That is, the camera finder device according to the fifth embodiment moves the entire eyepiece lens system 12 forward/backward to focus the eyepiece lens system 12 on the subject image formed by the objective lens system 1, and this subject image is observed through the eyepiece lens 12a. Therefore, the subject image can be observed sharply even when the objective lens system 11 undergoes a change of state due to temperature variations and the like.

The first through fifth embodiments described above have dealt with the cases where the semitransparent mirrors 4 and 16 are interposed to branch the finder optical path. However, other configuration may be used to branch the optical path. For example, an appropriate reflecting surface of the erecting optical systems 3 and 15 may be formed into a semitransparent mirror to divide the optical path.

In addition, the focus detection devices 7 and 20 may be arranged to obtain the subject image in synchronization with e.g. the ranging operation of the photographic optical system, triggered by half-pressing the release button. This makes it possible to form the subject image as needed.

As has been described above, in the camera finder device according to the present invention, the finder optical system is provided with the function for focusing the subject image. Therefore, the subject image can always be observed sharply through the finder optical system even if the finder optical system suffers a change under the influence of temperature and the like. The distance information concerning the finder optical system is obtained independent of the distance information obtained by the auto-focus device provided in the photographic optical system. Therefore, even when the photographic optical system undergoes a change, the focusing state of the finder optical system is unaffected.

Moreover, in the camera finder device according to the invention, an appropriate optical member in the objective lens system can be driven to form the subject image on the focal plane of the finder optical system. Furthermore, in the camera finder device according to the invention, an appropriate optical member in the eyepiece lens system can be driven to obtain focus on the subject image formed by the objective lens system for sharp observation of the subject image.

Additionally, the provision of the dioptric lens system, combined with the driving of the focus lens system in the eyepiece lens system, makes it possible to focus the eyepiece lens system on the subject image as well as to make a diopter adjustment for the photographer.

While there has been described what are at present considered to be preferred embodiments of the invention, it will be understood that various modifications may be made thereto, and it is intended that the appended claims cover all such modifications as fall within the true spirit and scope of the invention.

The invention claimed is:

1. A finder device of a camera having a variable focusing device for changing the focal length of a photographic optical system comprising:

a finder optical system including a movable optical member, wherein said finder optical system is independent from said photographic optical system;

a focus detector system for providing a detection control signal, said focus detector system having a focus detection plane situated on the optical path of said focus detector system at a position equivalent to the focal plane of an objective lens system of said finder optical system;

means for branching the optical path of the finder optical system onto the focus detector system; and driving means coupled to said focus detector system and to said finder optical system for moving said movable optical member of said finder optical system forward and backward along an optical axis on the basis of said detection control signal from said focus detector system so that said finder system focuses on said focal plane.

2. A finder device of a camera according to claim 1, wherein the finder optical system is comprised of an objective lens system including a focus lens and an eyepiece lens system, and wherein the optical path is branched out in front of said eyepiece lens system to said focus detector system, and said driving means moves an optical member of said objective lens system forward and backward.

3. A finder device of a camera according to claim 2, wherein said driving means moves said focus lens of said objective lens system forward and backward.

4. A finder device of a camera according to claim 2, wherein said driving means moves said entire objective lens system forward and backward.

5. A finder device of a camera having a variable focusing device for changing the focal length of a photographic optical system comprising:

a finder optical system having an objective lens system and an eyepiece lens system having a movable optical element, wherein said finder optical system is independent from said photographic optical system;

means for branching the optical path of said finder optical system out in front of said eyepiece lens system;

a focus detector positioned in the optical path branched out from said finder optical system, said focus detector having a focus detection plane situated on the optical path of said focus detector; and driving means coupled to said focus detector and to said finder optical system for moving said optical member of said eyepiece lens system forward and backward along the optical axis on the basis of a signal from said focus detector so that the focus position of said eyepiece lens system is adjusted to the focus position formed by said objective lens system.

6. A finder device of a camera according to claim 5, wherein said eyepiece lens system includes a movable dioptic lens system and said driving means moves a dioptic lens system of said eyepiece lens system forward and backward.

7. A finder device of a camera according to claim 6, wherein said driving means moves the entire eyepiece lens system forward and backward.

8. A finder device of a camera according to claim 7, wherein said eyepiece lens system includes a focus lens system and said driving means moves said focus lens system of said eyepiece lens system forward and backward.

9. A finder device of a camera according to claim 8, wherein said eyepiece lens system comprises a dioptic lens system.

* * * * *